United States Patent [19]

Fanizza et al.

[11] 4,400,723
[45] Aug. 23, 1983

[54] OPTICAL ASSEMBLY FOR PROJECTION TELEVISION RECEIVER

[75] Inventors: Michael A. Fanizza, Mount Prospect; Richard G. Schmid, Glenview, both of Ill.

[73] Assignee: Zenith Radio Corporation, Glenview, Ill.

[21] Appl. No.: 314,591

[22] Filed: Oct. 26, 1981

[51] Int. Cl.³ ............................................. H04N 9/31
[52] U.S. Cl. .................................... 358/60; 358/237; 358/254
[58] Field of Search ................... 358/60, 63, 237, 238, 358/239, 254, 255

[56] References Cited

U.S. PATENT DOCUMENTS

| 2,476,494 | 7/1949 | Jones | 358/254 |
| 4,058,837 | 11/1977 | Muntz | 358/237 |
| 4,087,835 | 5/1978 | Nishimura | 358/60 |
| 4,209,807 | 6/1980 | Arita | 358/237 |
| 4,219,843 | 8/1980 | Takahashi | 358/60 |

Primary Examiner—Michael A. Masinick

[57] ABSTRACT

A novel optical assembly is disclosed for use in an ultra-compact, jack-in-the-box projection television receiver. The stationary optical assembly is permanently installed in a lower portion of the cabinet for forming a television image, and projecting an aerial image of the television image upwardly a predetermined image projection distance along an optical path folded by optical path folding means. The receiver includes a unitary optical assembly having a viewing screen selectively storable in the cabinet and elevatable therefrom for receiving and displaying the image. The stationary optical assembly comprises the following, in combination: an image source means for forming the television image, a cathode ray tube holding assembly, and mirror means to reflect the aerial image steeply upward along the folded optical path. Also included are chassis means for receiving and supporting the image source means, CRT holding assembly, and mirror means. The optical assembly according to the invention may also find application in a receiver in which the unitary optical assembly is fixed in permanent elevation from the receiver cabinet.

2 Claims, 7 Drawing Figures

OPTICAL ASSEMBLY FOR PROJECTION TELEVISION RECEIVER

CROSS-REFERENCE TO RELATED APPLICATIONS

This application is related to but in no way dependent upon copending applications of common ownership herewith including: Ser. No. 228,434 filed Jan. 26, 1981; Ser. No. 259,333 filed April 30, 1981, now Patent No. 4,349,845; Ser. No. 238,861 filed Feb. 27, 1981; and Ser. No. 258,206 filed May 27, 1981.

BACKGROUND OF THE INVENTION

This invention concerns projection television systems, and is largely directed to a system in which a rear projection screen, storable in the system cabinet, is elevatable for viewing.

A system of this type is described and fully claimed in referent copending application Ser. No. 228,434. A jack-in-the-box projection television receiver comprises a cabinet for enclosing the components of the receiver, and includes a lid hinged at the back of the cabinet. The receiver comprises a vertically arranged, elevatable rear projection screen selectively storable in the cabinet. Image source means provide for forming a television image. Stationary optical assembly means—the subject of the present application—provides for projecting an aerial image of a television image formed by the image source means along a folded optical path onto the screen when the optical path is erected, and the screen is located a predetermined image projection distance from the image source means. The receiver further includes means for elevating the screen from a first receiver-inoperable position wherein the screen is completely enclosed within the cabinet and the receiver is ultra-compact, to an elevated receiver-operable position wherein the screen is emerged from the cabinet. As a result, the optical path is extended to a length equal to the predetermined image projection distance whereby the projection image is coincident with the screen.

In U.S. Pat. No. 4,259,694, Reinhard discloses an invention that relates to a projection system for diapositive film strips. The projection system comprises an essentially cubic projection box, the front side of which comprises a ground glass plate as the screen. Inside, there is a projector and two reflecting mirrors arranged to project the projecting beam exiting from the projector onto the screen. The projector is disposed such that its optical axis passes through the optical center of an objective, forming an acute angle together with the optical axis of the objective. As a result, the principal ray of the projecting beam exiting from the projector is inclined toward that wall of the projection box at which the projector is located. The object of the invention appears to be to make possible a smaller depth of the projection box while providing a distortion-free image.

In U.S. Pat. No. 4,231,067 to Jewell et al., there is disclosed apparatus for supporting a television receiver housing and projecting an image from the face of the picture tube to a remote, reflective front projection screen. The apparatus includes a base providing an inclined support surface for the TV housing. A hood defining a closed path is included. At one end, the hood encircles the face of the TV picture tube, and at the opposite end, there is mounted a projection lens barrel frictionally engaged for unitary focusing movement. The apparatus is mounted on casters so that it can be moved about with respect to a free-standing viewing screen. The base is said to provide for quick mounting and removal of various sizes of TV sets.

In U.S. Pat. No. 3,943,282, Muntz discloses a projection television apparatus in which the projected image is reflected by a mirror contained in a pull-out drawer at the front of the cabinet. The reflected image is directed from the mirror to the front of a curved screen for display of the enlarged image. A television receiver is mounted on an inclined platform within the cabinet, with a cathode ray tube facing upwards. A mirror-and-lens system provides for directing the television image toward the mirror, and for enlarging the image.

OBJECTS OF THE INVENTION

It is an object of this invention to provide a novel optical component for use in the ultra-compact, jack-in-the-box projection television receiver described and claimed in referent copending application Ser. No. 228,434, in which a viewing screen is selectively storable on the receiver cabinet and elevatable therefrom.

It is another object of this invention to provide an optical component for use in a projection television receiver in which the viewing screen is fixed in permanent elevation.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENT

Figure 1A:
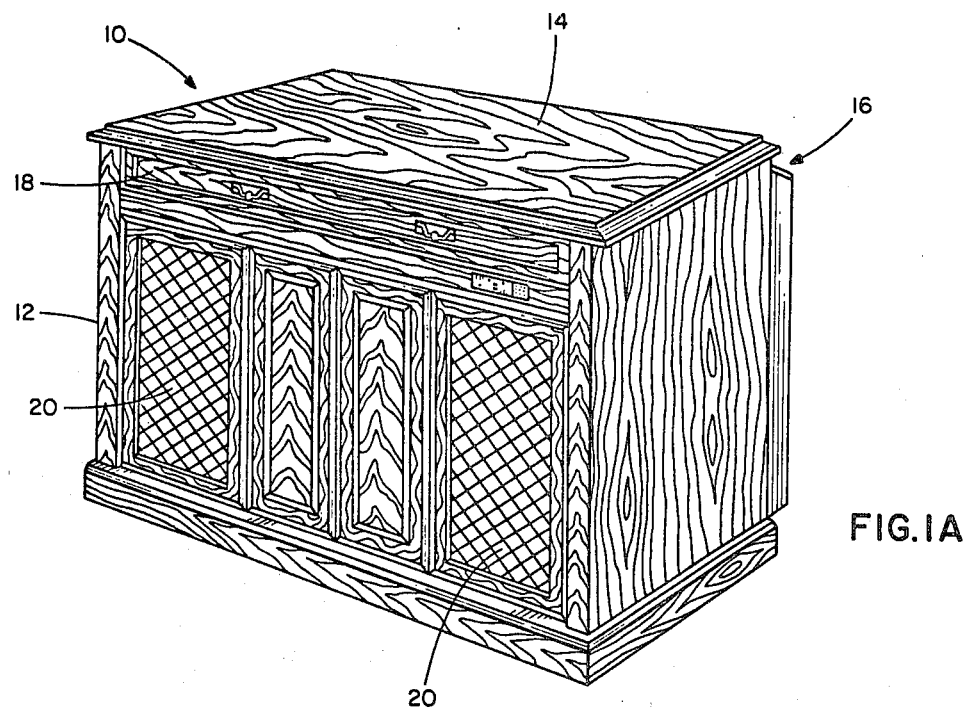
FIGS. 1A and 1B are oblique viewed in perspective of a projection television receiver according to the invention described and claimed in referent copending application Ser. No. 228,434. There is depicted, respectively, a first, receiver-inoperable position; and a second, receiver-operable position wherein a rear projection screen is elevated from the receiver cabinet for viewing.

An ultra-compact, jack-in-the-box, projection television receiver according to the invention disclosed in referent copending application Ser. No. 228,434 is shown by FIG. 1A. The receiver 10 comprises open-topped cabinet means for housing the components of the receiver. Cabinet 12 has lid means 14 pivotally attached at the back of the cabinet; the pivot may consist of at least one hinge 16 which may comprise a piano hinge, for example. The lid 14 is depicted as having an overhanging panel cover 18 for covering a receiver control panel. Grilled aperture ports 20 provide for audio emission from concealed speakers of a stereo sound system, for example.

Figure 1B:
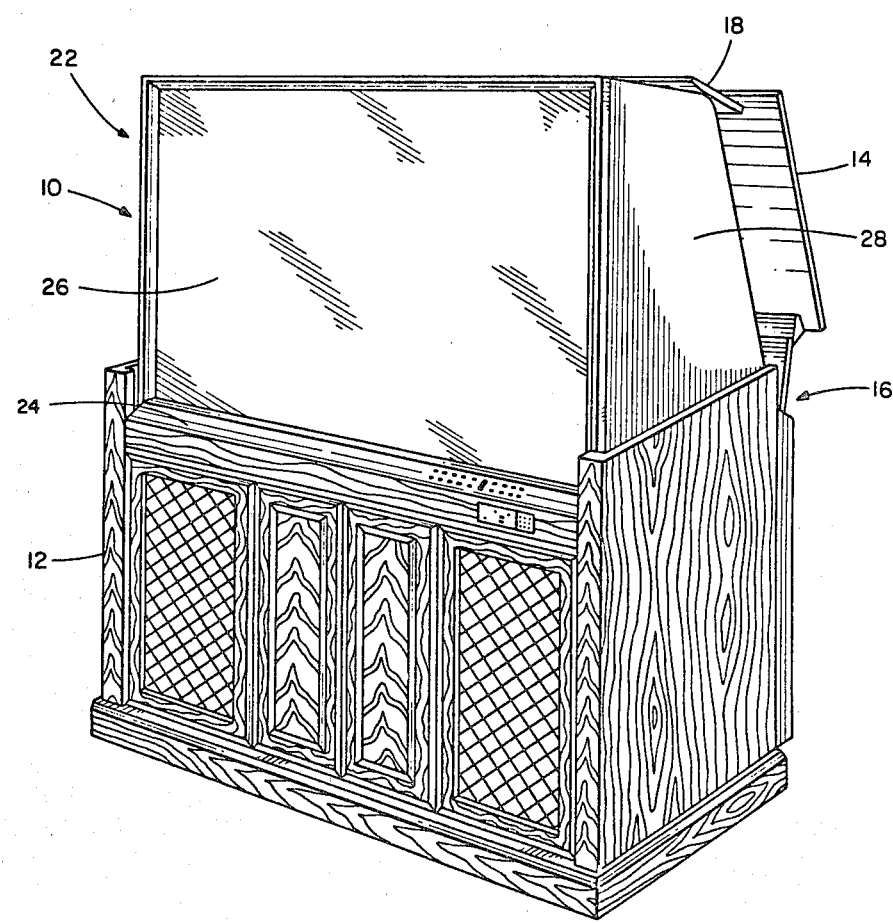

With reference now to FIG. 1B, lid 14 is shown as being raised and a unitary optical assembly means 22 is shown as being emerged from cabinet 12. Control panel 24, which may include all standard television receiver front panel controls such as controls for channel selection, audio volume, and various chromatic controls, is exposed by the raising of control panel cover 18 when lid 14 is raised. Control panel cover 18 is shown as being hingedly dependent from lid 14, as indicated. Control panel cover means 18 is described and claimed in referent Patent No. 4,349,845.

Unitary optical assembly means 22 is selectively storable in cabinet 12, and elevatable therefrom. Lid 14 provides for selectively opening and closing cabinet 12 for emergence and storage of unitary optical assembly 22. The unitary optical assembly 22 includes rear projection screen means 26 for displaying upon emergence a television image projected by receiver 10. The unitary optical assembly 22 further includes shroud means 28, which has an open front for receiving and supporting screen 26, as depicted. The unitary optical assembly 22 provides, by means of shroud 28, for maintaining screen 26 in a predetermined fixed relationship with the internal projection optical components of the receiver 10 when screen 26 is elevated from cabinet 12. The unitary optical assembly is fully described and claimed in referent copending application Ser. No. 238,861.

Figure 2:
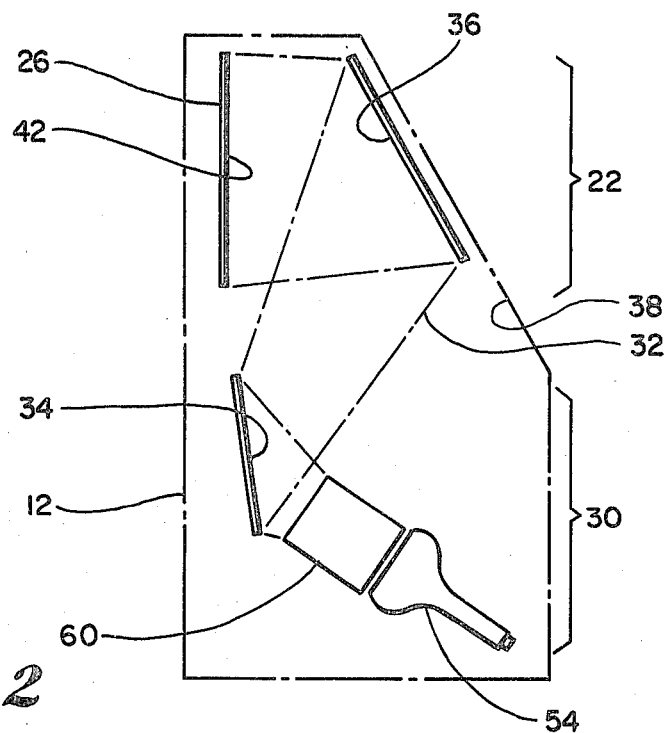
FIG. 2 is a schematic view of the components of the optical path of the receiver in relation to the receiver cabinet depicted as an outline.
Figure 3:
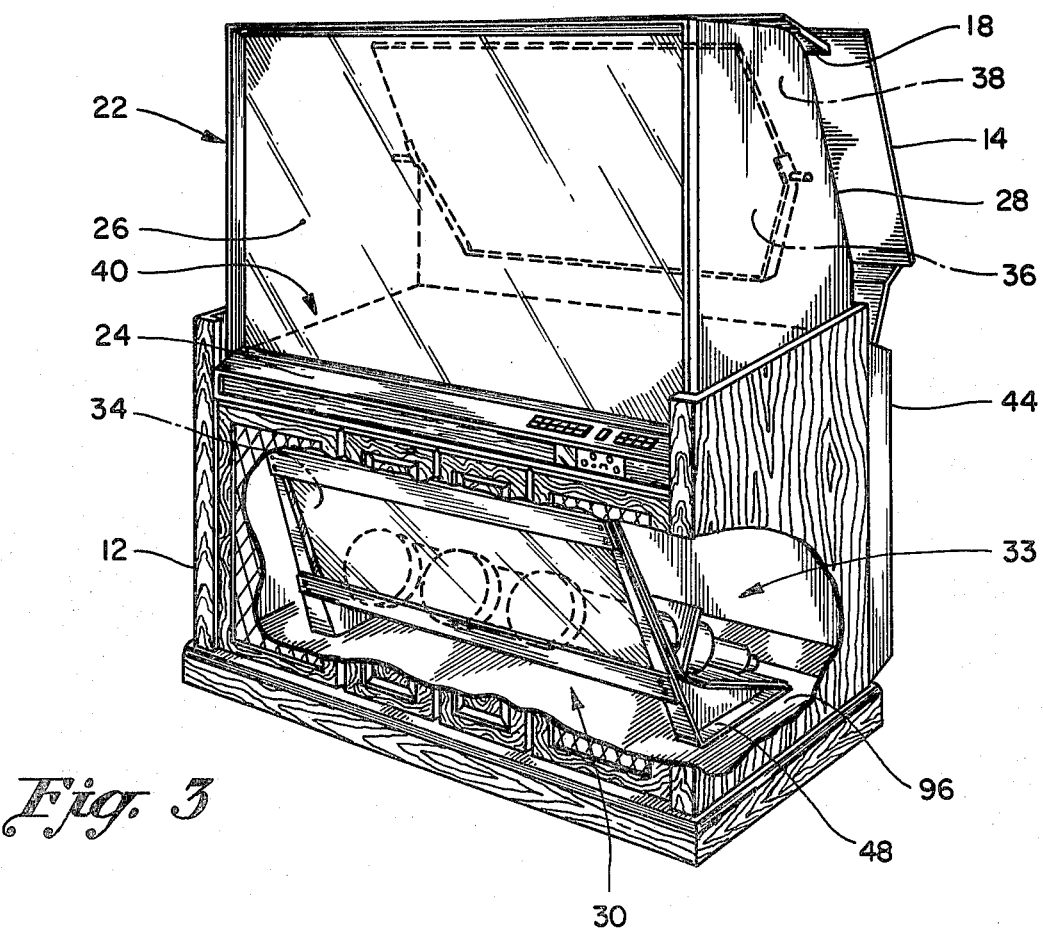
FIG. 3 is an oblique view in perspective depicting a projection television receiver with screen elevated and with the receiver cabinet partially cut away and certain components depicted in phantom to indicate the major components and their relationships.

The major components comprising the ultra-compact, jack-in-the-box television receiver 10 are depicted schematically in FIG. 2, and in a cutaway perspective view in FIG. 3. A stationary optical assembly means 30 according to the invention, indicated by a bracket, is permanently enclosed in a lower portion of cabinet 12 as indicated. Stationary optical assembly 30 according to the invention provides for forming a television image, and when the unitary optical assembly 22 is elevated, for projecting an aerial image of the television image upwardly a predetermined projection image distance along an optical path 32 folded by optical path folding means. The stationary optical assembly 30 according to the invention includes an image source means 33 and mirror means 34, which provides for receiving the aerial image and reflecting the aerial image steeply upwardly along the folded optical path 32.

The unitary optical assembly 22 is noted in this configuration of receiver 10 as being selectively storable in cabinet 12, and elevatable therefrom. The unitary optical assembly 22 comprises the following components, in combination. A second mirror 36 is arranged at a predetermined angle effective to receive the aforedescribed aerial image and reflect the image forwardly. Rear projection screen means 26 is located at the terminus of the optical path 32. Screen 26 is shown as being vertically arranged for receiving the aerial image reflected by mirror 36, and displaying the image. The unitary optical assembly 22 further includes the rigid, box-like shroud means 28, which has an open front for receiving screen 26, as depicted. Shroud 28 includes an inner back section 38 slanted at the predetermined angle of mirror 36 for spacedly receiving and mounting mirror 36 at the predetermined fixed, yet in finely adjustable relation to screen 26. Shroud 28 includes an open bottom area 40 for access of optical path 32. Shroud 28 is also depicted as having closed sides and a closed top for shielding mirror 36 and the inner surface 42 of screen 26 from ambient light. The shroud 28 is preferably made of a high-impact polystyrene formed in a pressure mold. The material is essentially a "structural foam" that provides strength and rigidity with light weight.

The unitary optical assembly provides, by means of shroud 28, for maintaining mirror 36 and screen 26 in a predetermined fixed relationship one with the other. Further, when the unitary optical assembly 22 is elevated, shroud 28 provides for establishing and maintaining mirror 36 and screen 26 in predetermined fixed relationship with the stationary optical assembly 30.

FIG. 1A depicts the location of the unitary optical assembly when the receiver is in a first, receiver-inoperable position wherein the unitary optical assembly 22 is stored in cabinet 12. When the unitary optical assembly 22 is in this position, receiver 10 is substantially as compact as a conventional large-screen console television receiver. Means are provided for lifting lid 14 and unitary optical assembly 22 including associated screen 26 to a second elevated receiver-operable position wherein screen 26 is emerged from cabinet 12; this configuration is depicted in FIGS. 1B and 3. When screen 26 is in the receiver-operable position, the receiver 10 is capable of displaying an image with an area greater than three times the image area of a conventional television receiver.

When unitary optical assembly 22 is fully emerged from cabinet 12, the length of the folded optical path 32 is equal to the aforedescribed projection distance, and the projected image is coincident with screen 26. The protractible and retractible optical system is fully described and claimed in referent copending application Ser. No. 258,206. Cabinet extension 44 provides additional space for enclosing shroud when unitary optical assembly 22 is stored in cabinet 12. Precision elevating means, (not shown) provide, in this receiver configuration, for elevating and lowering the unitary optical assembly 22 from and into cabinet 12.

Figure 4:
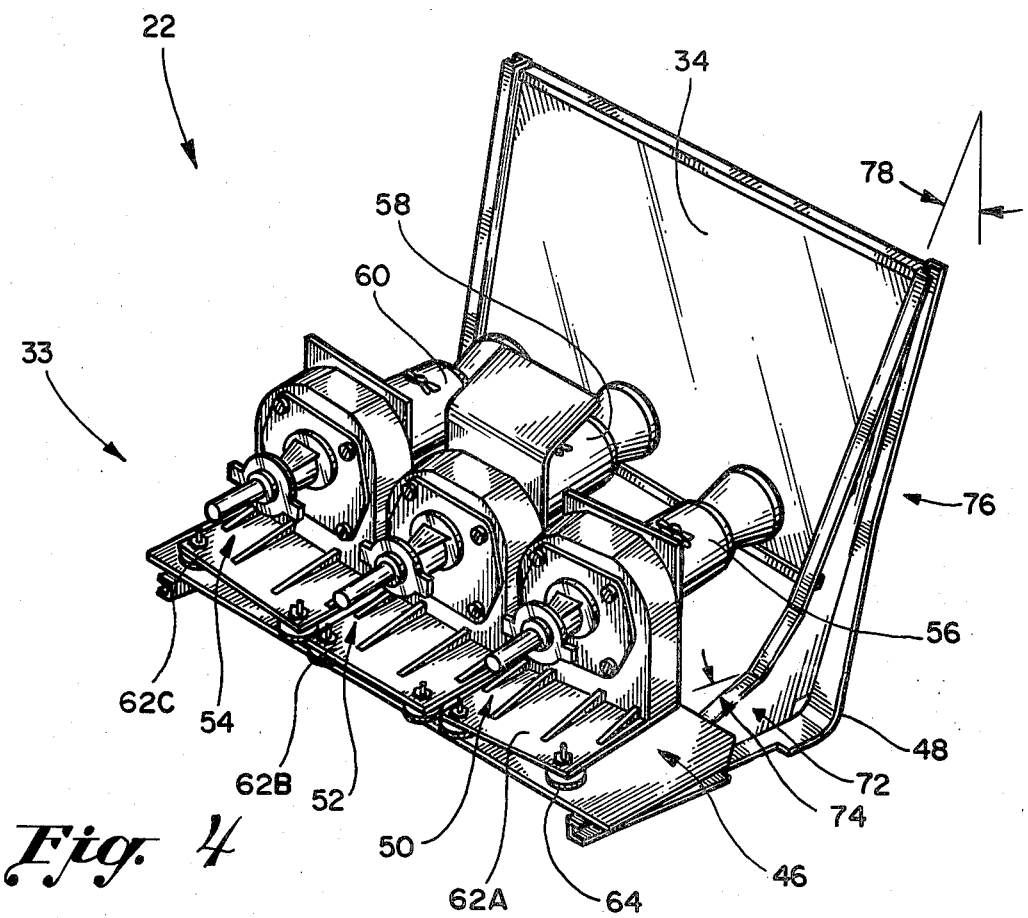
FIG. 4 is a view in perspective of a preferred embodiment of a stationary optical assembly according to the invention.

A preferred embodiment of the stationary optical assembly 30 according to the invention is shown in FIG. 4. (The general location of the assembly 30 in relation to the aforedescribed projection television system components is indicated in FIG. 3.) The stationary optical assembly 30 essentially comprises, in combination, the image source means 33, mirror means 34, cathode ray tube holding assembly 46 and chassis means 48. The image source means includes, respectively, red, green and blue image-forming cathode ray tubes 50, 52 and 54 for forming a composite television image. (Note: Only the respective necks of tubes 50, 52 and 54 are discernible in FIG. 4.) Each tube 50, 52 and 54 has an associated projection lens means 56, 58 and 60, respectively, on a substantially common axis therewith for projecting an aerial image of the television image along the optical path 32. The cathode ray tube holding assembly 46 provides for holding tubes 50, 52 and 54 in proper alignment. The CRT holding assembly comprises three "pods" mounted on integral respective associated base plates 62A, 62B and 62C. Each pod has a generally cylindrical hollow opening for receiving the front panel of the associated cathode ray tube, and a cover sized to fit the tube neck for engaging and centering the tube in the pod. Each base plate has means for leveling the associated pod; leveling means 64 is shown by way of example in conjunction with base plate 62A for leveling the pod containing of cathode ray tube 50 and associated projection lens 56.

Mirror means 34 is depicted as being closely adjacent to the projection means 56, 58 and 60 for reflecting the aerial image steeply upwardly along the folded optical path 32. Mirror 34 is preferably front-coated float glass having an aluminized surface enhancement-coated to ninety-four percent or greater reflectivity as measured with a Viscor filter and a Weston photocell at an angle of incidence of twenty-two point five degrees. Flatness is 20/20 fringes as measured using a Davidson Fizeau interferometer with a two-inch diameter aperture. Flatness is expressed in fringes of power/irregularity.

Figure 5:
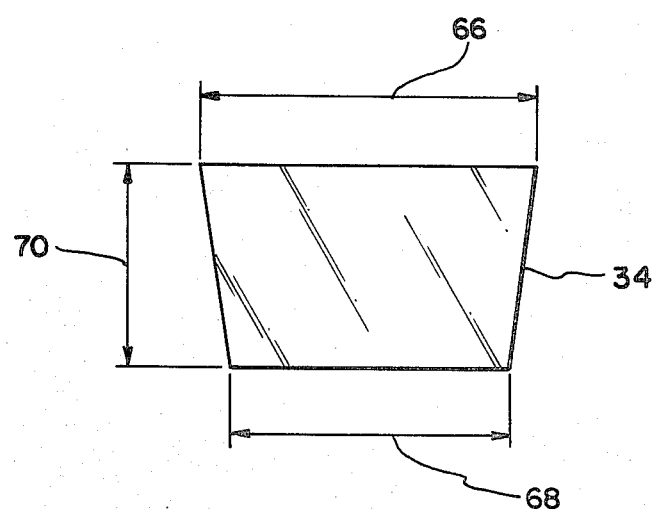
FIG. 5 is a diagram of a mirror component for which dimensional parameters are described.

With reference to FIG. 5, trapezoidally-shaped mirror 34 is preferably about twenty-one inches in width at the top (ref. No. 66), and about eighteen inches in width at the bottom (ref. No. 68). The height of mirror 34 is preferably about twelve inches (ref. No. 70).

Chassis means 48 provides for receiving and supporting image source means 33 and mirror means 34. Chassis means 48 is indicated in FIG. 4 as having a first platform 72 oriented at an upward projection angle 74 in the range of thirty to thirty-eight degrees, and preferably at an angle of about thirty-four degrees with respect to the horizontal for mounting cathode ray tube holding assembly 46. Chassis means 48 includes a second platform 76 for mounting mirror means 34 at a steeply upward reflection angle 78 in the range of twelvee to sixteen degrees, and preferably at an angle of about fourteen degrees.

The result of the means according to the invention is such that a television image is formed and an aerial image of the television image is projected steeply upwardly toward the unitary optical assembly 22 for display of the television image on screen 26.

Figure 6:
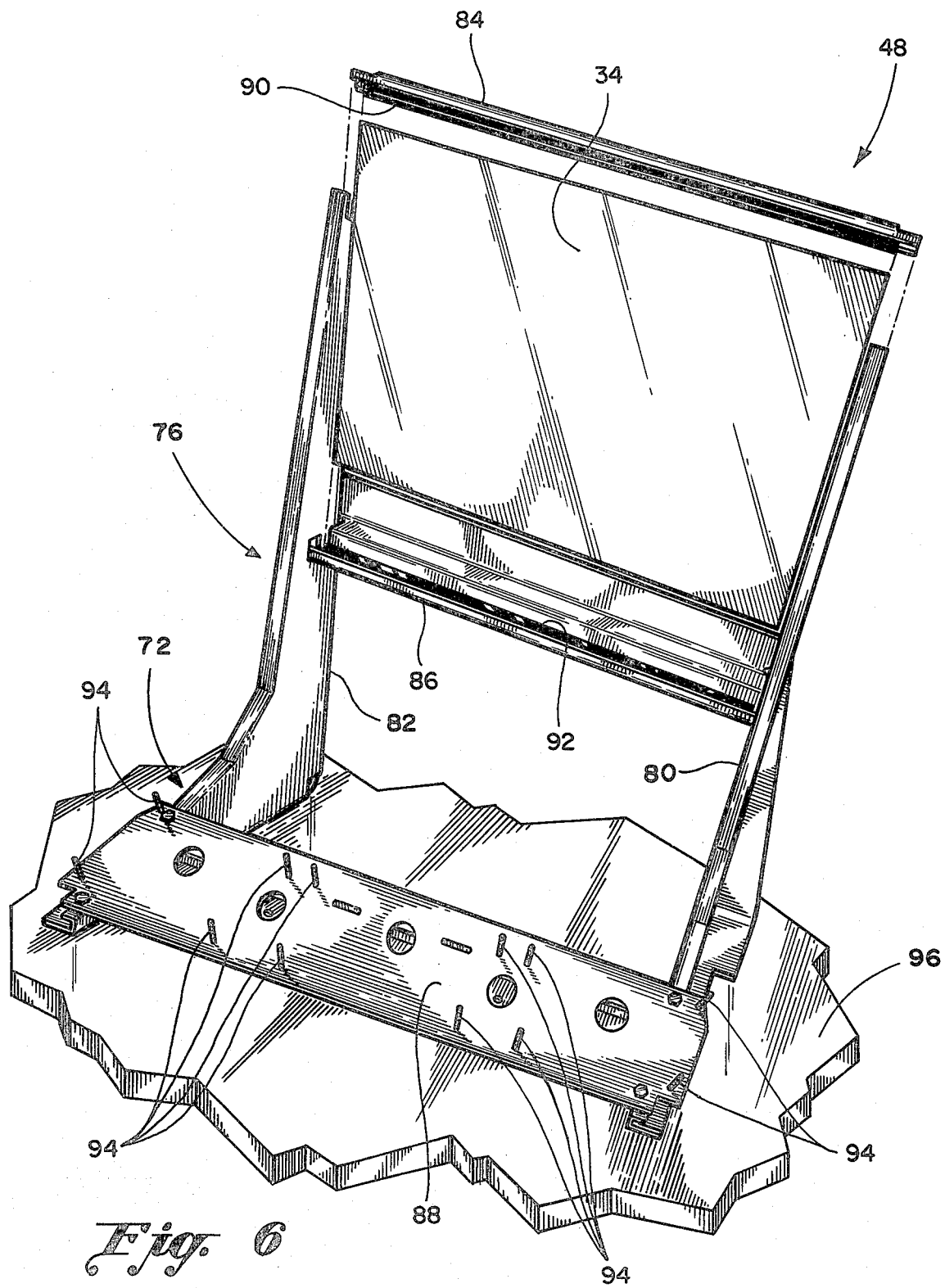
FIG. 6 is a view in perspective of a preferred means for mounting the components of the stationary optical assembly according to the invention.

FIG. 6 shows in greater detail the chassis means 48 and its components, and with a mirror 34 installed. Chassis means 48 comprises left-hand and right-hand brackets 80 and 82, upper and lower cross-braces 84 and 86, and a bed plate 88 for receiving the base plates on which the pods are mounted (see ref. No. 62, FIG. 4 for an example of a base plate.)

Upper and lower cross-braces 84 and 86 are channel-shaped to receive the top and bottom edges of mirror 34. Gasket means 90 and 92, made from a pliable material such as a synthetic rubber, are folded around the edges of mirror 34 for cushioning the relatively fragile mirror 34 from abrasion by the metal of channeled cross-braces 84 and 86, and cushioning as well against shock and vibration incidental to the handling and shipping of the projection television receiver. Bed plate 88 is indicated as having a plurality of upstanding threaded studs 94 for mating with holes (not shown) in the pod-mounting base plates 62A, 62B, and 62C.

The stationary optical assembly 30 according to the invention can be mounted directly on the floor 96 of cabinet 12, as indicated in FIGS. 3 and 6.

While a particular embodiment of the invention has been shown and described, changes and modifications may be made in the embodiment and in the receiver. For example, the stationary or "lower" optical assembly 30 according to the invention may be installed in a projection television receiver in which the unitary "upper" optical assembly is fixed in permanent elevation from cabinet 22. The general configuration of such a projection television receiver is represented in FIGS. 1B, 2 and 3.

The aim of the appended claims is to cover all such changes and modifications as follow within the true spirit and scope of the invention.

We claim:

1. For use in an ultra-compact, jack-in-the-box rear projection television receiver housed in a cabinet, stationary optical assembly means permanently installed in a lower portion of said cabinet for forming a television image and projecting said image steeply upwardly a predetermined image projection distance along an optical path folded by optical path folding means, said receiver including a unitary optical assembly having a viewing screen selectively storable in said cabinet and elevatable therefrom for receiving and displaying said image, said stationary optical assembly comprising, in combination:

image source means having a red, a green, and a blue image-forming cathode ray tube for forming a composite television image, each of said tubes having an associated projection lens means on a substantially common axis therewith for projecting an aerial image of said television image along said optical path, said image source means including cathode ray tube holding assembly means for holding said tubes and said projection lens means in proper alignment;

mirror means for receiving and reflecting said aerial image;

chassis means for receiving and supporting said image source means and said mirror means, said chassis means having a first platform oriented at an upward projection angle for mounting said cathode ray tube holding assembly means, and a second platform oriented at a steeply upward reflection angle for mounting said mirror means;

such that a television image is formed and an aerial image of the television image is projected steeply upwardly towards said unitary optical assembly for display of said television image on said screen.

2. For use in an ultra-compact, jack-in-the-box rear projection television receiver housed in a cabinet, stationary optical assembly means permanently installed in a lower portion of said cabinet for forming a television image and projecting said image upwardly a predetermined image projection distance along an optical path folded by optical path folding means, said receiver including a unitary optical assembly having a viewing screen selectively storable in said cabinet and elevatable therefrom for receiving and displaying said image, said stationary optical assembly comprising in combination:

image source means having a red, a green, and a blue image-forming cathode ray tube for forming a composite television image, each of said tubes having an associated projection lens means on a substantially common axis therewith for projecting an aerial image of said television image along said optical path, said image source means including cathode ray tube holding assembly means for holding said tubes and said projection lens means in proper alignment;

mirror means closely adjacent to said projection lens means for receiving and reflecting said aerial image;

chassis means for receiving and supporting said image source means and said mirror means, said chassis means having a first platform oriented at an upward projection angle in the range of thirty to thirty-eight degrees with respect to the horizontal for mounting said cathode ray tube holding assembly means, and a second platform oriented at a steeply upward reflection angle in the range of twelve to sixteen degrees with respect to the vertical for mounting said mirror means;

such that a television image is formed and an aerial image of the television image is projected steeply upwardly towards said unitary optical assembly for display of said television image on said screen.

* * * * *